United States Patent [19]
Schmatz et al.

[11] Patent Number: 5,096,110
[45] Date of Patent: Mar. 17, 1992

[54] CONTROL SYSTEM FOR VACUUM BRAZING PROCESS

[75] Inventors: Duane J. Schmatz, Dearborn Heights; Walter L. Winterbottom, Farmington Hills, both of Mich.

[73] Assignee: Ford Motor Company, Dearborn, Mich.

[21] Appl. No.: 628,058

[22] Filed: Dec. 17, 1990

[51] Int. Cl.$^5$ .............................................. B23K 31/12
[52] U.S. Cl. ...................................... 228/102; 228/8; 266/78
[58] Field of Search ................... 228/219, 221, 102, 8, 228/103; 73/61 R, 23.2; 266/84, 78

[56] References Cited

U.S. PATENT DOCUMENTS

| | | |
|---|---|---|
| 2,980,416 | 4/1961 | Strassburger ........................... 228/84 |
| 3,321,828 | 5/1967 | Miller . |
| 3,359,784 | 12/1967 | Torre et al. ........................... 73/23.2 |
| 3,373,483 | 3/1968 | Miller . |
| 3,378,914 | 4/1968 | Miller . |
| 3,457,630 | 7/1969 | Schwartz et al. . |
| 4,143,802 | 3/1979 | Winterbottom . |
| 4,172,548 | 10/1979 | Nakamura . |
| 4,240,574 | 12/1980 | Schmatz et al. . |
| 4,505,418 | 3/1985 | Neidig et al. ........................... 228/219 |
| 4,719,073 | 1/1988 | Langan ................................... 73/23.2 |
| 4,804,128 | 2/1989 | Brittin . |
| 4,808,788 | 2/1989 | Bares . |
| 4,886,449 | 12/1989 | Brittin . |

FOREIGN PATENT DOCUMENTS

| | | | |
|---|---|---|---|
| 0324294 | 7/1989 | European Pat. Off. . | |
| 2513920 | 4/1983 | France | 228/219 |
| 0028786 | 7/1980 | Japan | 228/219 |
| 56-13430 | 9/1981 | Japan . | |
| 1135784 | 1/1985 | U.S.S.R. | 266/78 |

OTHER PUBLICATIONS

W. L. Winterbottom and G. A. Gilmour, "Vacuum Brazing of Aluminum: Auger Studies of Wetting and Flow Characteristics", J. Vac. Sci. Technol., vol. 13, No. 2, Mar./Apr. 1976.

Primary Examiner—Richard K. Seidel
Assistant Examiner—James Miner
Attorney, Agent, or Firm—Raymond L. Coppiellie; Roger L. May

[57] ABSTRACT

This invention is directed to a control system and method of vacuum brazing of aluminum workpieces in a chamber wherein the combination of the partial pressure of water and the partial pressure of oxygen is adjusted to be within a determined desired combination pressure range as a function of the temperature within the chamber as the workpieces are heated up to a temperature of about 500° C.

19 Claims, 3 Drawing Sheets

CONTROL SYSTEM FOR VACUUM BRAZING PROCESS

BACKGROUND OF THE INVENTION

1. Field of the Invention

The present invention relates to a control system or apparatus and method for a vacuum brazing process. The control system and method of the invention allows aluminum workpieces to be adequately brazed.

2. Discussion of the Related Art

Over the past several years, the realization that the world's supply of copper is rapidly being depleted has provided a strong impetus to evaluate alternate materials in many important applications. Aluminum, because of its abundance, good thermal conductivity, light weight, and good formability, has become a prime candidate as a replacement material for automotive heat exchangers previously made with copper. The stability of a surface oxide film present on aluminum, however, is a definite impediment to fabrication of such an assembly from aluminum parts, such as by brazing. In brazing, a filler metal is provided at the joints of the assembly for their formation. The surface oxide film, however, discourages the flow of the filler metal and acts as a barrier to the wetting of the aluminum part by the filler metal. Oxide removal and prevention of reoxidation are the principal requirements for successfully fabricating an assembly from aluminum parts.

Fluxless brazing has assumed a position of commercial importance because it does not require the removal of a flux residue. One of the first innovations to promote better fluxless brazing was the discovery that magnesium, when incorporated as part of the filler metal, promotes the wetting of the oxide by the filler metal when liquified during brazing. However, gaseous species of oxygen ($O_2$) and water ($H_2O$) within the brazing chamber can react with the magnesium to build an oxide layer to a thickness which envelopes the liquid filler metal and prevents its flow and reduces its ability to wet. This is particularly troublesome when brazing in an inert atmosphere but it also occurs, although to a lesser degree, in vacuum brazing.

Winterbottom U.S. Pat. No. 4,143,802 discloses the fluxless brazing of aluminum parts in an inert or low vacuum environment wherein the reaction with gaseous species of $O_2$ and $H_2O$ are controlled during brazing by rapid heating through a critical temperature range (such as 400° C.–590° C.) during heat up to brazing temperatures. It is taught therein that by limiting the time spent in the critical temperature range, it is possible to reduce the time available for the reaction of gaseous $O_2$ and $H_2O$ to form duplex oxide.

Schmatz et al. U.S. Pat. No. 4,240,574 is directed to a method of brazing aluminum parts in an inert gas atmosphere, like nitrogen, comprising gaseous species of oxygen and water each in the range of 1–10 ppm. According to the patent, it is critical that the filler metal alloy used at the joining sites of the parts consist of Si-Mg-Al, with the magnesium comprising between 0.2%–0.6% by weight of the alloy.

Bares U.S. Pat. No. 4,808,788 is directed to an oven for the vacuum brazing of aluminum which includes a sealed enclosure having a first heating device for raising the parts to be treated to the brazing temperature, and a pumping device adapted for forming a vacuum inside the enclosure. The oven further includes a support structure located outside the sealed enclosure but inside the oven for supporting magnesium. A second heating device separately heats the magnesium based on the results of the analysis of the gaseous composition present inside the oven, in particular its oxygen and water vapor content. This requires a considerably larger and more complicated furnace adding to the expense of brazing components. In practice, adding excess magnesium to the system as suggested by Bares to act as a getter for water and oxygen is seen as problematic. The porous deposits of magnesium which form on the walls or shields in the oven retain water and gases absorbed when the system is opened to air or during part transfer. As a result, it takes longer to reach the desired vacuum with each subsequent evacuation. Consequently, in practice, parts are fabricated using filler material containing a minimum amount of magnesium. That is, the amount in the filler material is only that amount which is necessary to allow the parts to be adequately brazed based on the inherent characteristics, e.g., vacuum obtainable and cycle time, of the system.

When parts are vacuum brazed according to prior art processes, the resultant assemblies often comprise adequately brazed joints as well as some that are not. Inadequately brazed joints often exhibit poor performance characteristics related to soundness (leaks, inadequate joint strength and undesirable fillet shape) and integrity (excessive base metal core dissolution and corrosion resistance). A less than desirably brazed assembly joint may be supplementally sealed with another material to assure an adequate joint. Such additional sealing of the joints, however, is commercially inefficient and costly. As a result, numerous assemblies are merely discarded.

Many of the problems of poor brazeability are believed to be caused by the way process controls are established. In practice, the operator controlling the vacuum brazing equipment sets the furnace to a cycle where the temperature ramps as a function of time based on his experience with the particular furnace and the size of the load to be brazed. Based on past experience, he assumes that an adequate vacuum level is going to be obtained in the time established for the cycle. However, as the furnace chamber becomes contaminated with porous magnesium deposits which absorb $O_2$ and $H_2O$ as discussed above, it becomes more difficult to attain an adequate vacuum in the chosen cycle time. Water is very difficult to remove when absorbed on interior chamber surfaces and magnesium deposits. Oxygen is easier to remove but can reenter the chamber through faulty seals. The result is that the chamber often has an inadequate vacuum due primarily to the high partial pressures of water and oxygen. As discussed above, at these high levels the water and oxygen react with the magnesium in the filler material to increase the oxide layer thickness on the aluminum. Parts are brazed inadequately when these conditions prevail.

SUMMARY OF THE INVENTION

It has been found that in order to consistently produce adequately brazed assemblies in a vacuum brazing chamber, the combination of the partial pressures of water and the partial pressure of oxygen in the chamber must be critically controlled up to the time when a temperature of 500° C. is reached in the chamber. That is, when the partial pressure of water is low, a higher partial pressure of oxygen is acceptable in the chamber and vice-versa. In effect, it has been found that it is a "sum" of these partial pressures which is the limitation which is critical to consistently produce adequately brazed assemblies and not just the individual partial pressures.

It is an object of the present invention to provide a system for controlling adjustable environmental conditions within a vacuum brazing chamber so that production of adequately brazed joints of aluminum or aluminum alloy assemblies will consistently be assured.

It is a further object of the present invention system to provide a fault warning signal or intelligent control system should the vacuum brazing chamber be incapable of providing an adequately brazed assembly due to some problem with the chamber or associated equipment. Then the brazing run could be terminated prior to the chamber reaching the brazing temperature and the problem corrected so as to avoid producing inadequately brazed assemblies.

The present invention is directed to a system for controlling adjustable environmental conditions within a vacuum brazing chamber so that the combination of the partial pressure of oxygen and the partial pressure of water in the chamber is adjusted to be within an acceptable combination pressure range as a function of the temperature within the vacuum brazing temperature up to a chamber temperature of about 500° C. The chamber is used to braze workpieces comprising aluminum or an aluminum alloy carrying filler metal alloy comprising magnesium on joining sites of the workpieces. The acceptable combination pressure range would be predetermined experimentally and is a function of the particular chamber used, the nature of the filler metal alloy (i.e. the amount of magnesium in the alloy), and the number of workpieces. The system includes a pressure sensing means for sensing the partial pressure of oxygen and the partial pressure of water within said chamber. The pressure sensing means further includes means for generating pressure signals corresponding to the sensed pressures. The system of this invention also includes a temperature sensing means for sensing the temperature within the vacuum chamber, with the temperature sensing means further comprising means for generating a temperature signal corresponding to the sensed temperature. The system of the present invention further includes heating means, for controllably heating the workpieces within the vacuum chamber at a variable chosen heating rate, and pumping means for removing gases from the vacuum chamber.

The system additionally includes processor means operatively associated with the pressure sensing means, the temperature sensing means, the heating means, and the pumping means for operating the heating means and the pumping means. The processor means includes: (i) means for receiving the pressure signals and the temperature signal, ii) means for comparing the magnitude of the pressure signals and the magnitude of the temperature signal with a set of signals representing acceptable pressure combinations within the chamber as a function of the temperature within the chamber, (iii) means for producing a control signal in the event that, prior to reaching a temperature of about 500° C. in the chamber, the combination of the sensed pressures is outside the acceptable pressure combination range at the sensed temperature, and (iv) adjustment means responsive to the control signal for adjusting the combination of the partial pressure of oxygen and the partial pressure of water in the chamber to correspond to an acceptable combination pressure as a function of the sensed temperature, comprising means for controlling the pumping means and the heating means. The system preferentially further comprises fault warning means operatively connected to the processor for detecting an inability of the adjustment means to adjust the combination of the partial pressure of oxygen and the partial pressure of water in the chamber to a pressure within the acceptable combination pressure range and for generating a fault warning signal in response to the detection.

According to another aspect of the invention, it is directed to a method for controlling adjustable environmental conditions within a vacuum brazing chamber, providing the steps of: (a) measuring the partial pressure of oxygen and the partial pressure of oxygen in the chamber, (b) measuring the temperature in the vacuum brazing chamber, (c) comparing the magnitude of the combination of the partial pressure of oxygen and the partial pressure of water with a set of determined desired partial pressure combinations as a function of the temperature within the vacuum brazing chamber, (d) producing a control signal in the event that, prior to reaching a temperature of about 500° C. in the vacuum brazing chamber, the combination of the partial pressures is outside the determined desired partial pressure combinations at the temperature of the vacuum brazing chamber, and (e) adjusting the operation of a heating means and a vacuum pumping means operatively connected to the vacuum brazing chamber whenever the control signal is produced.

According to another aspect of the invention, it is directed to a method of fluxless brazing of aluminum parts in a vacuum brazing chamber, the method including: (a) preparing and structurally relating together in the chamber workpieces to form an assembly having joining sites carrying filler metal alloy comprising aluminum, silicon and magnesium, (b) heating the workpieces within the vacuum brazing chamber, (c) subjecting the vacuum brazing chamber to pumping means for removing gases from the vacuum brazing chamber, and (d) adjusting the combination of the partial pressure of oxygen and the partial pressure of water in the chamber to be within a determined desired range as a function of the temperature within the vacuum brazing chamber up to a temperature of about 500° C. Preferably, the rate at which the assembly is heated and the time during which the vacuum brazing chamber is subjected to a vacuum pumping means are controlled by a processor.

DETAILED DESCRIPTION OF PREFERRED EMBODIMENTS

Figure 1:
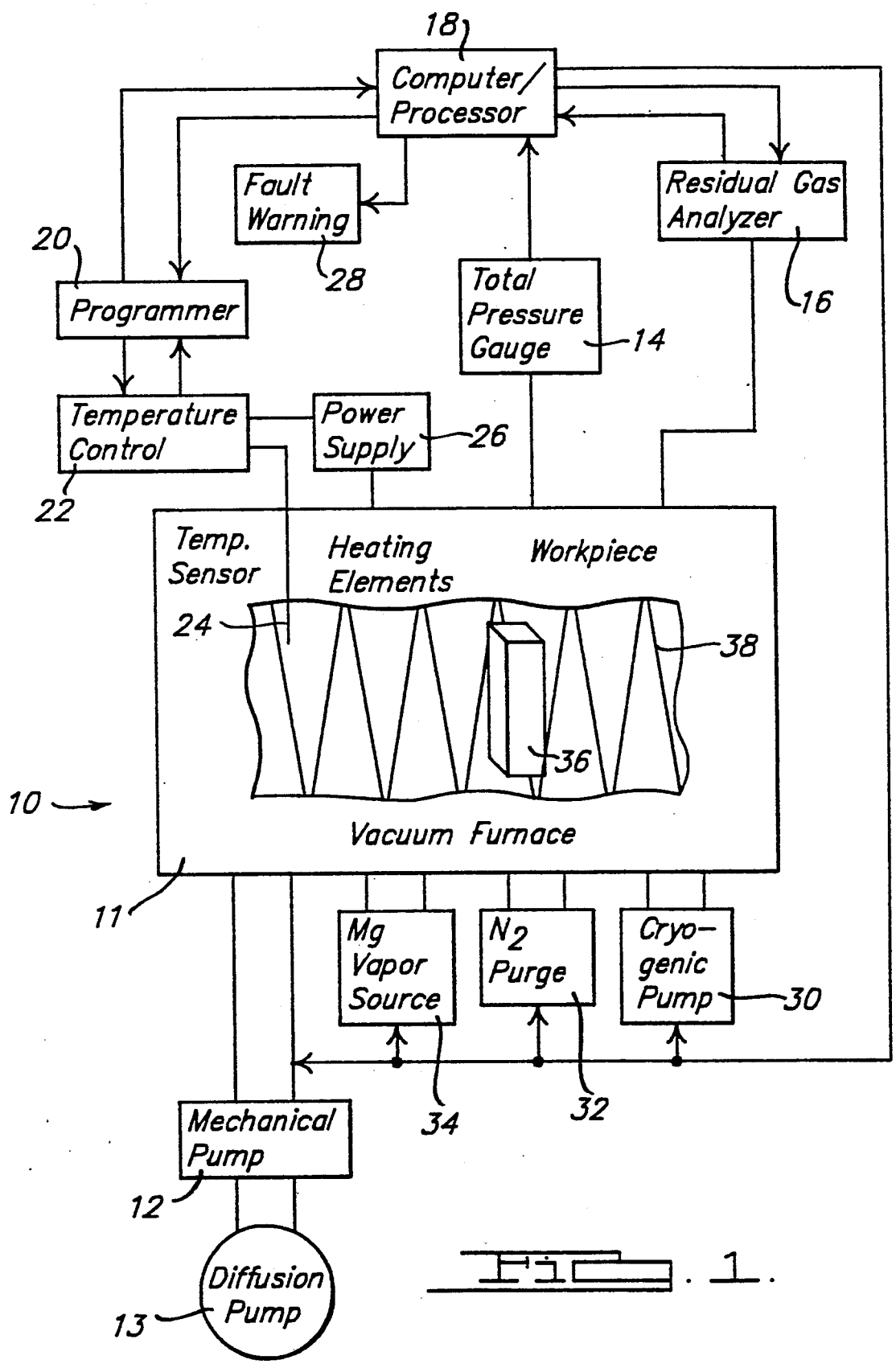
FIG. 1 is an overall system block diagram according to a preferred embodiment of the present invention.

It has been found that at the temperatures at which brazing occurs, i.e., 500° C. and above, the magnesium from the filler metal begins to vaporize in large quantities. If in addition, the combination of the partial pressures of oxygen and water present in the chamber is above a critical amount, detrimental oxidation will occur at the surface of the workpiece components. As a result, under these conditions brazed joints produced will be less than desirable. Inadequately brazed joints commonly exhibit "stitching" of the joint fillet, i.e., the joint fillet is discontinuous. In the case of heat exchangers, for example, further degradation of such joints may develop large unbrazed regions which allow leaks from the coolant to the air side of the heat exchanger.

On the other hand, it has been found that if the combination of the partial pressure of oxygen and the partial pressure of water in the vacuum brazing chamber is within a determined desired range as a temperature of 500° C. is reached in the chamber, no such oxidation will take place at the joining surfaces when the parts are brazed above 500° C. The magnesium vapor generated from the filler material during brazing will, as a matter of fact, beneficially act as a getter to remove the acceptable low levels of oxygen and water from the area of the joint.

More particularly, it has been found that while fairly high individual levels of water and oxygen can be tolerated in a good brazing situation, in certain combinations they produce poor brazing. For example, according on one particular system studied, it was found that sample aluminum parts could be adequately brazed in a vacuum chamber having a water partial pressure level 10 times higher than that normally found as a residual level in the system. The addition of a very low partial pressure of oxygen just above $1 \times 10^{-8}$ torr to such a high water system, however, produced poor brazing. Likewise, with water at low residual levels in the vacuum brazing chamber, aluminum samples can be brazed with oxygen levels nearly 50 times above residual levels. In the latter situation, however, including water at a partial pressure only slightly above normal residual pressure, produced poorly brazed parts. What we have found is that the "sum", or more correctly, the combination of the partial pressures of oxygen and water has a greater effect on the quality of brazing than the individual oxygen/water partial pressures and that such combinations are unique and based on each particular system. The variables that contribute to this unique combination that need to be determined include the size of the vacuum brazing chamber, the number of parts, and the composition of braze clad.

The present invention, according to one aspect, is directed to a system for controlling adjustable environmental conditions within a vacuum brazing chamber so that the combination of the partial pressure of oxygen and the partial pressure of water in the chamber is adjusted to be within a determined desired range when the vacuum chamber is heated up to about 500° C. Workpieces brazed according to the present invention are aluminum or an aluminum alloy carrying filler metal alloy comprising aluminum, silicon and magnesium, on joining sites of the workpiece. According to the present invention, the filler metal may be carried on one or all of the surfaces at the joint to be brazed.

FIG. 1 shows an overall system 10 including a vacuum brazing chamber 11, having an aluminum workpiece 36 therein. The system is equipped with a pumping system comprising a mechanical pump 12 and a diffusion pump 13 to evacuate the system generally to the range of $1 \times 10^{-4}$ to $1 \times 10^{-5}$ torr. Numerous chambers and pumps are commercially available as, respectively, from Abar-Ipsen, GCA Industries, and Varian Industries. Total pressure sensing means 14 senses the total pressure within the system utilizing, e.g., either an ion or cold cathode gauge as that available from Granville-Phillips, and MKS Instruments. Partial pressure sensing means such as a residual gas analyzer 16, (RGA), senses the partial pressures of water and of oxygen within chamber 11. Such means are commercially available from, e.g., Ametek of Thermox Instruments Div., or Inficon of Leybold-Heraeus. In the preferred embodiment of FIG. 1, a pressure reducing valve (not illustrated) was employed between chamber 11 and the RGA 16 that has an effect of reducing the actual values of the partial pressure in chamber 11 by a factor of about 100. That is, the actual partial pressure values within the chamber are roughly 100 times higher than the given measured values when using the pressure reducing valve. Other sensors capable of sensing oxygen and/or water in a vacuum could be used in place of or in conjunction with a residual gas analyzer.

The temperature within chamber 11 is measured by temperature sensing means which includes, according to this embodiment, thermocouple(s) 24 and programmer 20. Signals from pressure sensing devices 14 and 16 and the temperature sensing means including components 24 and 20 are sent to a computer/processor 18 such as an IBM AT, which compares the partial pressure of water and oxygen in chamber 11 with determined desired "sums" or combinations of partial pressures of water and oxygen as a function of the temperature in chamber 11.

Computer/processor 18, preferably using an algorithm analysis computer program, controls programmer 20 which is used to adjust the temperature within chamber 11 by means of a temperature controller 22, thermocouple 24 and heating elements 38. The programmer 20 and temperature controller 22 are usually made as one unit available, e.g., from Honeywell or Micristar. The temperature controller 22 controls the power supplied to the heating elements 38 through a power supply 26.

Cryogenic pump 30, nitrogen purge system 32, and magnesium vapor source 34 are systems which may be activated by the computer 18 via the program to assist in reducing the partial pressures of water and oxygen in the chamber to be within the determined desired range. This reduction can, in most cases, be done simply by allowing "time" to become a variable of the process which would allow additional evacuation time to remove the critical contamination species, namely oxygen and water. However, short purges of an inert gas such as nitrogen can be used to "flush" out the contaminants. A cryogenic pumping system with pump 30 could be used to remove excess water from the braze chamber. In very special and only under extreme circumstances would magnesium vapor be introduced into the chamber from a source other than the braze clad. This would lower the oxygen and water for that run, but then may make the system dependent on magnesium vapor in subsequent cycles because of the build up of deposits. Any other means to lower the partial pressures of oxygen and water may also be used.

The cryogenic pump 30, e.g., available from Leybold-Heraeus, uses a cooling system to condense moisture. Nitrogen purge systems 32 may consist simply of electrically activated valves that allow nitrogen into the system for a short duration. A magnesium vapor source 34 can be obtained by heating magnesium inside the chamber with separate heating elements controlled by the computer/processor 18 and a power supply. A fault warning means 28 (an output device such as a printer or visual display), programmed through the computer/processor 18 warns that conditions, e.g., determined desired partial pressure combinations as a function of chamber temperature, have not been achieved by comparison to determined desired set points. In addition, the warning system 28 could be activated should it take longer than desired to reach those conditions, e.g., too long a pumping time. Both situations could be an indication that the control system including the chamber needs to be checked to see if, e.g., the chamber needs to be cleaned of magnesium buildup which might be hampering the achievement of obtaining desired conditions. If pumping time becomes excess relative to a clean, leak free system, maintenance is probably required.

Figure 2:
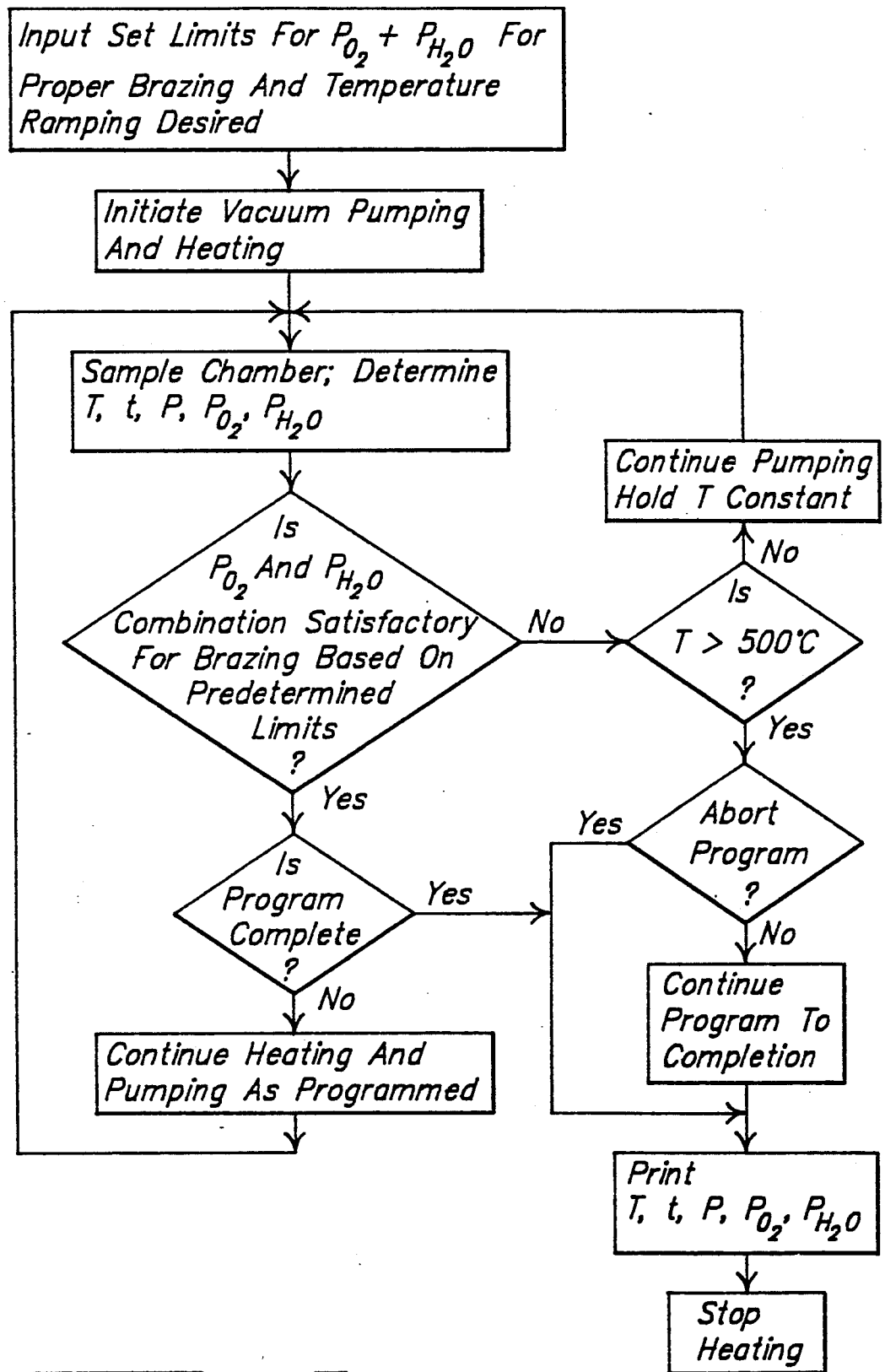
FIG. 2 is a flow diagram according to a preferred embodiment of the present invention.

According to a preferred logic sequence of the invention control system shown in FIG. 2, a computer program contains determined desired ranges (limits) of the partial pressures of oxygen and water at various temperature check points. The limits are those determined in previous experimental monitoring of such conditions which produced adequate brazing conditions with the particular system up to 500° C. Total time and the rate of heating and maximum temperature preferred for the brazing process are also preset into the computer/processor 18. As the process is started, actual temperature T), partial pressures of oxygen ($P_{O_2}$) and water ($P_{H_2O}$), total pressure (P), and time (t) are recorded as input data from the thermocouple(s), residual gas analyzer, ion gauge and internal clock of the computer/processor 18. These actual values are compared by the computer/processor 18 to the desired limiting values.

At each comparison of desired to actual values, which can be done as often as desired, but probably best done at prescribed temperatures and/or prescribed times, the question is asked if the actual partial pressure combination is over the desired limit. If the pressure is over the limit, the question is asked as to whether the temperature is over 500° C. If it is not, the program will be held until adequate values are obtained by the prescribed methods such as by holding the temperature constant and continuing the pumping. Other means of lowering the actual partial pressures can be utilized and can be programmed into the computer/processor. These means include cryogenic pumping, purges with inert gas such as nitrogen, or vaporization of magnesium from a separate source. The program then continues to sample the chamber and test whether the chamber has been brought within the predetermined limits for proper brazing. If the temperature is over 500° C., the process can be aborted or it can be continued to completion while risking further contamination of the chamber as described above. In either case a fault signal will be given stating that conditions existed that were over the prescribed desired limit and the pumping system or cleanliness/tightness of the vacuum furnace should be checked.

After each sampling of the chamber, the program continues to compare the values of $P_{O_2}$ and $P_{H_2O}$ versus the temperature to its predetermined limits. If the combination of actual values of partial pressures for the sampled temperature are below the desired limit, the program tests if the process is completed. If not, the process continues on the time-temperature ramp set initially and continues to sample the chamber. This continues until the program is completed or the partial pressures go outside the limits as described above. If the program is completed, the data related to the process are displayed/printed as a function of time or temperature or both, e.g., partial pressure of oxygen and water as a function of time and/or temperature, total pressure as a function of time and/or temperature, and time vs temperature. If time is over the preset limit the alert or default warning is printed/displayed to clean/inspect system. If time is within the preset limit, the next run can be made.

Figure 3:
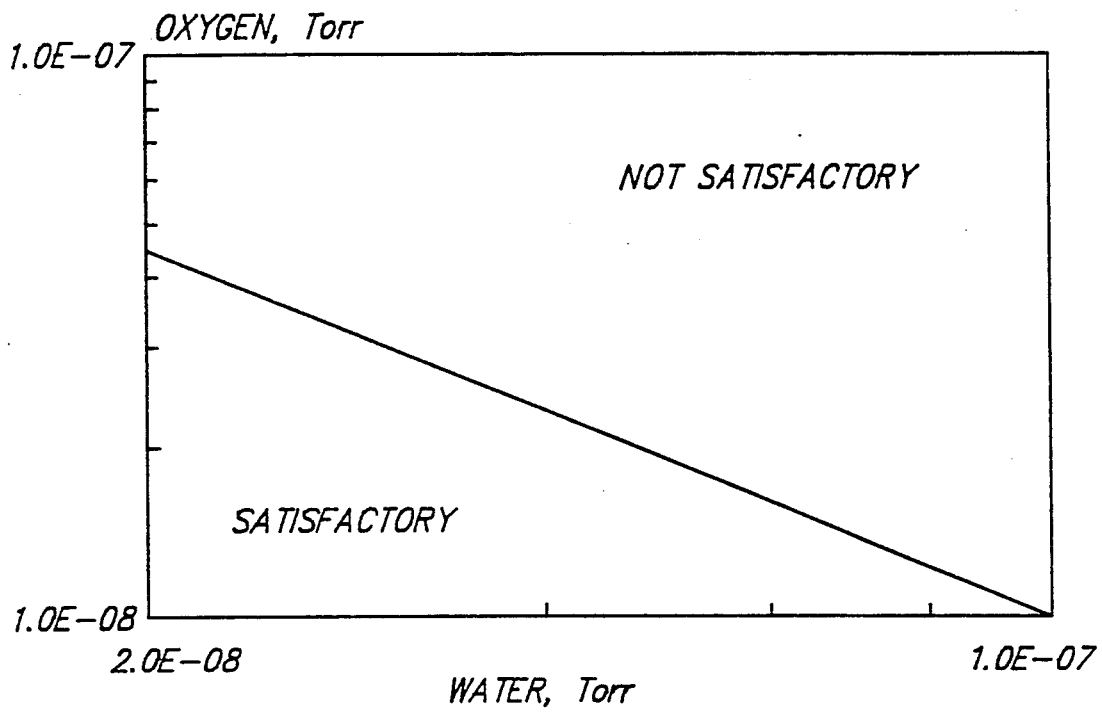
FIG. 3 is a graph illustrating the influence of the values of oxygen and water partial pressures on brazeability in a vacuum brazing chamber at about 500° C., according to an embodiment of the present invention.

The following two examples illustrate the processing method used to obtain the data in Table 1 and used to establish FIG. 3.

EXAMPLE 1

Two samples consisting of single tube and header sections of an unbrazed radiator consisting of an aluminum alloy core AA 3003 and a clad alloy AA 4104, were placed in a vacuum chamber bell jar system. The vacuum bell jar is approximately 18 in. dia. × 18 in. tall and was evacuated by a 11 CFM (cubic feet per min.) mechanical pump and a 6 in. liquid nitrogen trapped oil diffusion pump. Total pressure was measured with an ion gauge and partial pressures of oxygen and water were measured with a residual gas analyzer (RGA), Model 200M, Dycor, Thermox Corp. The 2 samples were heated with two 6 in. × 4 in. tantalum ribbon heaters surrounded by stainless steel shields. The temperature and heating rate was controlled by a Micristar temperature programmer/controller such that a 23 min. cycle produced a maximum temperature of 595° C. Oxygen was admitted to the system as air through a calibrated leak valve. Water was admitted to the system directly through a second calibrated leak valve. The samples were preheated to 200° C. to obtain a vacuum of $1 \times 10^{-6}$ torr. in the chamber. For this example water was admitted at a rate to produce a partial pressure of $4 \times 10^{-8}$ torr. and oxygen was admitted at a rate to produce a partial pressure of $2 \times 10^{-8}$ torr. This leak rate of air (oxygen and nitrogen) produced a total pressure in the chamber of $1 \times 10^{-4}$ torr. After setting the partial pressures of oxygen and water, heating commenced at a heating rate of approximately 20° C./min. with a 3 min. hold at 595° C. Very little change in partial pressures were noted until above 500° C. when a reduction in water and oxygen began to occur as the magnesium began to vaporize from the AA4104 aluminum clad alloy. At 555° C. a very pronounced decrease in both the oxygen and water occurred since a large burst of magnesium was produced as the ternary eutectic Al-Si-Mg melts at this temperature. The samples were removed when cooled and examined. At the partial pressures of oxygen and water set for this example, the samples brazed very well with generous fillets and without stitching or pin holes.

EXAMPLE 2

In this example two identical samples as in example 1 were brazed in the same manner except the partial pressure of water was increased to $6 \times 10^{-8}$ torr. and the partial pressure of oxygen was increased to $3.2 \times 10^{-8}$ torr. The total chamber pressure due to the air leak to obtain the correct oxygen partial pressure was $1.5 \times 10^{-4}$. After brazing, the samples were removed and examined. Fillets were much smaller and contained stitching and pin holes. These joints were classified as "Not Satisfactory".

An experiment having sixteen samples was carried out along the lines of the above two examples at various combinations of oxygen and water partial pressures at 500° C. The results are shown in Table 1.

TABLE 1

| Oxygen Partial Pressure | Water Partial Pressure | | | |
|---|---|---|---|---|
| | $2 \times 10^{-8}$ | $4 \times 10^{-8}$ | $6 \times 10^{-8}$ | $1 \times 10^{-7}$ |
| $4.5 \times 10^{-8}$ | fair/good | fair/poor | poor | poor |
| $3.2 \times 10^{-8}$ | good | fair | fair/poor | poor |
| $2 \times 10^{-8}$ | very good | good | fair | fair/poor |
| $1 \times 10^{-8}$ | very good | good | good | fair/good |

These results were used to provide the graph in FIG. 3 having a line separating the "Satisfactory" from the "Not Satisfactory" partial pressure combinations. The area indicated as "Satisfactory" is where, for the experimental system in which this was determined, the combination of partial pressures of water and oxygen is low, e.g., oxygen at $2 \times 10^{-8}$ and water at $4 \times 10^{-8}$ torr. Fillets of joints are complete and uniform and of an adequate size for strength and heat transfer. In the area designated "Not Satisfactory", the combination of partial pressures of water and oxygen are high enough to produce an unsatisfactory joint, e. g., "stitching" or discontinuities in the fillet and pin holes occur. An example of an unsatisfactory combination of partial pressures of oxygen and water is $2 \times 10^{-8}$ torr oxygen and $7 \times 10^{-8}$ torr water.

The line graph of FIG. 3 is a better representation of the results since it can be characterized by an equation which defines the relationship between the oxygen and water mathematically. The line is defined by $\text{Log}[P_{O_2}] = -0.9345 \text{ Log}[P_{H_2O}] - 14.541$. The equation can be programmed into the computer/processor to determine whether the environment (partial pressures of oxygen and water), is in the "Satisfactory" or "Not Satisfactory" range. This line was determined with a particular brazing system, with a given number of samples, and with a braze clad of a specific composition. Each of these factors (size of system, load of components and composition of the clad), will alter the position of the line somewhat, however, it is easily determined for each particular system.

Figure 4:
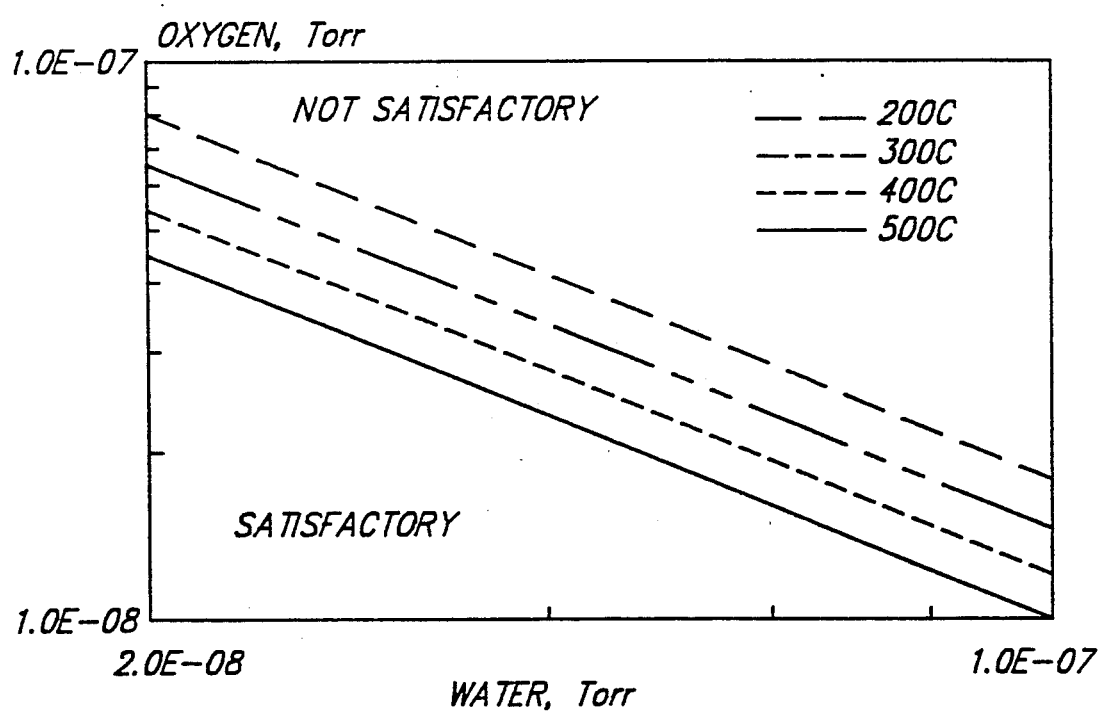
FIG. 4 is a graph illustrating the influence of the values of oxygen and water partial pressures on brazeability in a vacuum brazing chamber at various temperatures up to about 500° C., according to an embodiment of the present invention.

FIG. 4 shows the influence of oxygen and water partial pressures on the brazeability of aluminum using the sixteen samples in the experimental vacuum system at various temperatures. The initial partial pressures of oxygen and water are high during the early stages of the process and therefore the set points must be higher at the lower temperatures. This is well understood by those knowledgeable of vacuum brazing. As evacuation continues, the vacuum improves with time and the set points as the temperature increases can be decreased as indicated in FIG. 4. Each line in FIG. 4 for a particular temperature has an equation, similar to that for 500° C., that can be programmed into the computer/processor 18 and utilized in the control process. The exact position of the lines at each temperature will have to be determined experimentally for a particular brazing system.

EXAMPLE 3

This example illustrates the operation of a production vacuum brazing furnace with a control system operating according to a preferred embodiment of the present invention. The vacuum furnace is made of a size to accommodate any size and quantity of components required. The pumping system consists of mechanical pumps, blowers, diffusion pumps and cryogenic pumps as required to adequately evacuate the furnace to the required pressure, $1 \times 10^{-4}$ to $1 \times 10^{-5}$. Total pressure is measured with either an ion gauge or cold cathode gauge. Partial pressures of oxygen and water are measured by a residual gas analyzer which is capable of sending a signal of the levels of these constituents to a computer/processor 18. The signals of the partial pressures are input to the computer/processor which compares the levels to that required according to the combination of the partial pressures using the equations of the lines shown in FIG. 4, or similar equations developed for a particular system. Pumping of the system is started and heating is begun at a rate preset into the computer program. At the first check point temperature, 200° C., the computer compares the measured levels of the partial pressures with those defined by the equation for 200° C. in FIG. 4. Following the logic diagram in FIG. 2, the question is asked whether the "sum" or combination value is within the preset limit? If yes, the program checks if it has completed the run and if not, the programmed heating and pumping is continued at the rate initially set up. If no, the program checks whether the temperature is over 500° C. If the temperature is over 500° C., a warning signal is given to that effect. The predetermined plan of action programmed in the computer should then take effect and either the run can be completed or it can be aborted. If the temperature is below 500° C., pumping is continued without additional heating until the partial pressure combination is below the limit.

The computer program can also have many alternatives. If pumping time exceeds a set limit, other means of reducing the partial pressures can be instigated, such as cryogenic pumping, nitrogen purges, or vaporization of magnesium from an external source. This sequence of comparing the partial pressures of oxygen and water to the preset combined values is continued with check points at predetermined temperatures until the program is complete. The data are printed to produce a record of the run.

A major concern is the total time to complete the run. The computer can be programmed to ask whether the total time of the run is over the preset time limit. If it is, a signal can be printed/displayed warning that time exceeded the limit. A new set of components is loaded after the present set is removed and the program repeated. If, however, a warning signal were present in the previous run, appropriate preventative action should be taken.

In view of the disclosure, many modifications of this invention will be apparent to those skilled in the art. It is intended that all such modifications which fall within the true scope of this invention be included within the terms of the appended claims.

We claim:

1. An apparatus for controlling a vacuum brazing chamber comprising:
   pressure sensing means for sensing the partial pressure of oxygen and the partial pressure of water within said chamber;
   temperature sensing means for sensing the temperature within said chamber;
   heating means for heating said chamber at a predetermined heating rate;
   pumping means for removing gases from said chamber;
   control means for receiving signals indicative of the partial pressures of oxygen and water and the temperature, for controlling said heating means and said pumping means based on the partial pressures of oxygen and water.

2. An apparatus according to claim 1, wherein said control means includes means for comparing the partial pressure signals and the temperature signal with a set of signals representing a desired range of the combination of partial pressures of oxygen and water as a function of temperature.

3. An apparatus according to claim 2, wherein said control means includes means for producing a warning signal when the combination of partial pressures is outside the desired range at the sensed temperature.

4. An apparatus according to claim 3, wherein said warning signal is produced as long as the sensed temperature is less than 500° C.

5. An apparatus according to claim 2, wherein said control means modifies the action of at least one of the heating means and the pumping means when the combination of partial pressures is outside the desired range at the sensed temperature.

6. An apparatus according to claim 5, further comprising at least one of:
(a) a cryogenic pumping means for evacuating said chamber, wherein said cryogenic pumping means is controlled by said control means;
(b) a means for providing inert gas into said chamber, wherein said inert gas providing means is controlled by said control means; and
(c) a means for introducing a metered quantity of magnesium vapor into said chamber, wherein said vapor introducing means is controlled by said control means.

7. An apparatus according to claim 2, further comprising at least one of:
(a) a cryogenic pumping means for evacuating said chamber, wherein said -cryogenic pumping means is controlled by said control means;
(b) a means for providing inert gas into said chamber, wherein said inert gas providing means is controlled by said control means; and
(c) a means for introducing a metered quantity of magnesium vapor into said chamber, wherein said vapor introducing means is controlled by said control means.

8. An apparatus according to claim 2, wherein said control means varies at least one of the length of time said pumping means is operative and the rate of temperature increase.

9. An apparatus according to claim 1, further comprising a cryogenic pumping means for evacuating said chamber, wherein said cryogenic pumping means is controlled by said control means.

10. An apparatus according to claim 1, further comprising a means for providing inert gas into said chamber, wherein said inert gas providing means is controlled by said control means.

11. An apparatus according to claim 1, further comprising a means for introducing a metered quantity of magnesium vapor into said chamber, wherein said vapor introducing means is controlled by said control means.

12. A method according to claim 11, wherein said adjusting step further comprises at least one of the following:
(i) subjecting the chamber to a cryogenic pump means for a suitable time;
(ii) introducing a metered quantity of nitrogen gas into the chamber; and
(iii) introducing a metered quantity of magnesium vapor into the chamber.

13. A method for controlling conditions within a vacuum brazing chamber, comprising the steps of:
measuring the partial pressure of oxygen and the partial pressure of water in the chamber;
measuring the temperature in the chamber; and
adjusting the operation of at least one of a heating means and a pumping means based on the partial pressures of oxygen and water at the sensed temperature.

14. A method according to claim 13, wherein prior to said step of adjusting, said method includes comparing the partial pressure signals and the temperature signal with a set of signals representing a desired range of the combination of partial pressures of oxygen and water as a function of temperature.

15. A method according to claim 14, further comprising producing a warning signal when the combination of partial pressure is outside the desired range at the sensed temperature.

16. A method of fluxless brazing a structure in a vacuum chamber, comprising the steps of:
placing the structure in the chamber;
heating the chamber;
evacuating gases from the chamber;
measuring the partial pressure of oxygen and the partial pressure of water in the chamber;
measuring the temperature in the chamber; and
adjusting at least one of the heating and the evacuating based on the partial pressures of oxygen and water at the sensed temperature.

17. A method according to claim 16, wherein prior to said step of adjusting, said method includes comparing the partial pressure signals and the temperature signal with a set of signals representing a desired range of the combination of partial pressures of oxygen and water as a function of temperature.

18. A method according to claim 17, further comprising producing a warning signal when the combination of partial pressure is outside the desired range at the sensed temperature.

19. A method according to claim 16, wherein said adjusting step further comprises at least one of the following:
(i) subjecting the chamber to a cryogenic pump means for a suitable time;
(ii) introducing a metered quantity of nitrogen gas into the chamber; and
(iii) introducing a metered quantity of magnesium vapor into the chamber.

* * * * *